United States Patent

[11] 3,525,299

[72] Inventors Harry A. Gouwens
South Holland, Illinois;
Earl E. Spillar, Lisle, Illinois
[21] Appl. No. 774,361
[22] Filed Nov. 8, 1968
[45] Patented Aug. 25, 1970
[73] Assignee General Electric Company
a corporation of New York

[54] AUTOMATIC BASKET LIFT MECHANISM
6 Claims, 8 Drawing Figs.
[52] U.S. Cl................................................. 99/336,
99/403, 99/410
[51] Int. Cl.............................................. A47j 37/12
[50] Field of Search ................................... 99/336,
319, 327, 330, 355, 403, 410, 417, 440; 126/369,
369.1, 369.2, 369.3; 134/135

[56] References Cited
UNITED STATES PATENTS
2,215,929 9/1940 Husk ............................. 99/410X
3,101,043 8/1963 Bushway ...................... 99/407
3,217,633 11/1965 Anetsberger ................. 99/403X
3,225,681 12/1965 Wells............................ 99/336
3,242,849 3/1966 Wells............................ 99/336UX Primary Examiner—Walter A. Scheel
Assistant Examiner—Arthur O. Henderson
Attorney—Arthur E. Fournier, Jr., David M. Schiller, Melvin M. Goldenberg, Frank L. Neuhauser, and Oscar B. Waddell ABSTRACT: A timer-controlled, automatic basket lift mechanism for use in food fryers including a basket hanger, a vertical shaft which is connected to the basket hanger at one end and secured at its other end to a carriage, a lift motor which is connected by a link and lever assembly to the carriage, and wherein a timer activates the lift motor shaft which by means of said link arm and lever arm lowers the carriage and hence the basket hanger into the frying area and after a predetermined time as set by the timer, automatically raises the carriage and basket hanger out of the frying area, the carriage moving on ball bearings which are located in channels which are laterally offset from the openings in the rear of the fryer so as to seal the ball bearings from contact with any of the cooking oil.

Patented Aug. 25, 1970

INVENTORS
HARRY A. GOUWENS
EARL E. SPILLAR

BY Arthur C. Fournie Jr.

ATTORNEY

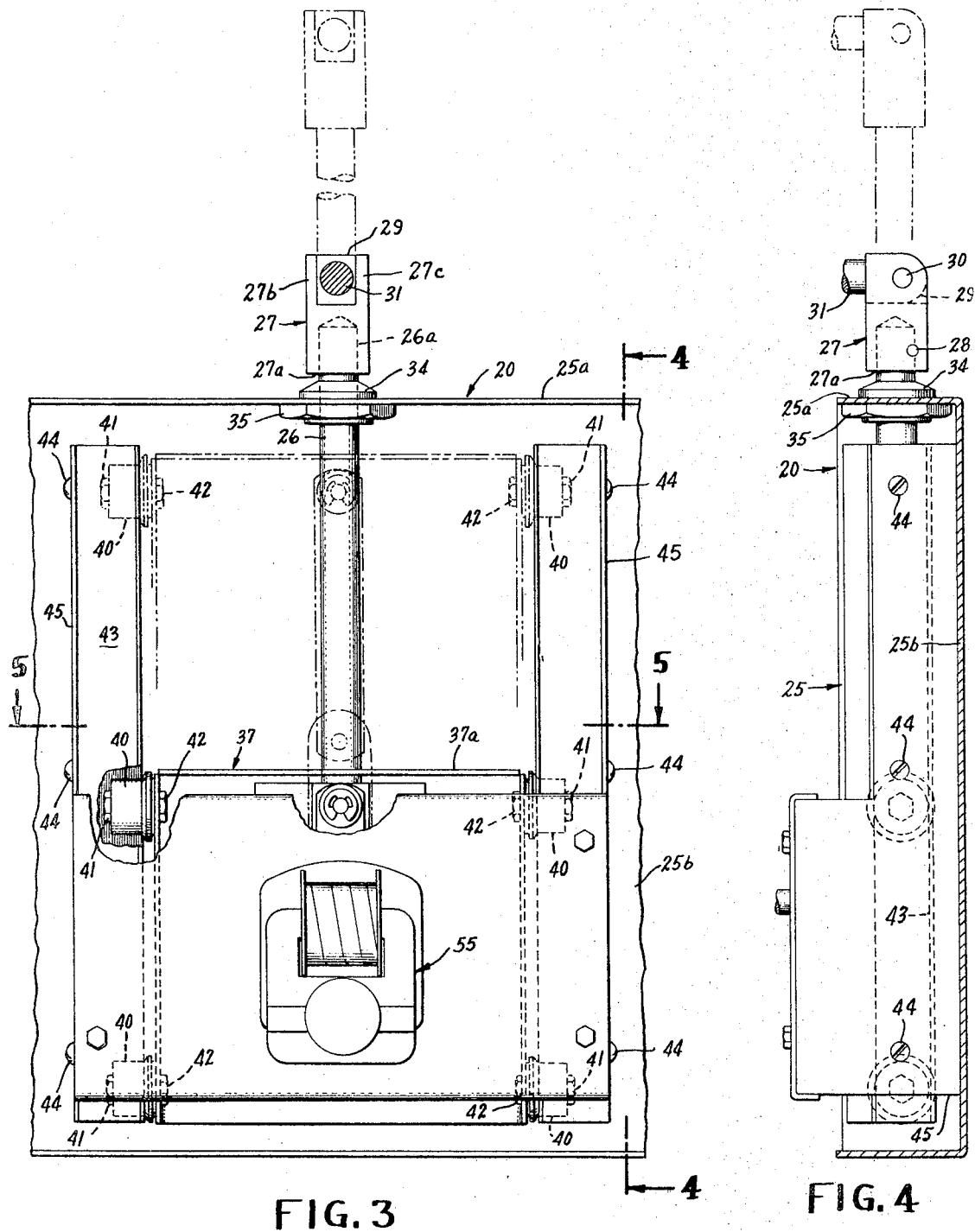

Patented Aug. 25, 1970

INVENTORS
HARRY A. GOUWENS
EARL E. SPILLAR

BY *Arter E. Townie Jr.*

ATTORNEY

AUTOMATIC BASKET LIFT MECHANISM

BACKGROUND OF THE INVENTION

Field of the invention

Our invention relates to food service equipment and more particularly to an improvement in food fryers of the type wherein food fryer baskets are lowered into and raised out of frying fat in accordance with a preselected timed cycle by means of a timer-controlled automatic basket lift mechanism.

Description of the prior art

Although it is known in the prior art to provide food fryers with automatic basket lift mechanisms, the mechanisms which have been utilized in the past for this purpose have been found to be deficient in one or more respects. The most common as well as the most serious of these deficiencies stems from the lack of protection from frying fat, i.e., oil used for cooking purposes, which is afforded to the operative moving parts of the basket lift mechanisms of such prior art food fryer devices.

Thus for example, most of these prior art food fryers use two sleeve bearings to guide and locate the vertical lift shaft which extends through the top of the housing of the device. It is by means of this shaft that the food fryer basket is carried into and out of the frying area. By virtue of this construction, the aforesaid vertical lift shaft is exposed to splashing, spilling, etc. of the cooking oils. After a period of time it has been found that these cooking oils will coat the shaft and clog the bearings. This is because the cooking oils subsequently solidify on the shaft and/or bearings into a consistency somewhat like varnish. The result is that an undue restraining force is placed on the various components of the lift mechanism during the operation thereof until some part breaks or slips. Although it has been suggested that wipers made of suitable material be used in conjunction with the lift mechanism to keep the moving parts thereof free of cooking oils, this has not proven sufficient to eliminate the problem.

Another undesirable characteristic of many prior art food fryers and one which is inherently occasioned by the particular construction thereof involves the unnecessary continued operation, i.e., running of the components of the basket lift mechanism while the food fryer basket is in a position of rest during and/or at the end of its cycle of operation. This additional wear and tear experienced by the aforesaid basket lift mechanism components has the potential of resulting in a substantial reduction in the life cycle for these particular parts.

OBJECTS OF THE INVENTION

It is therefore an object of the present invention to provide a novel and improved automatic basket lift mechanism for food fryers wherein all of the operative components of the automatic basket lift mechanism are located such as to be inaccessible to the cooking oils.

It is another object of the present invention to provide such an automatic basket lift mechanism for food fryers wherein the moving parts of the automatic basket lift mechanism do not operate, i.e., run when the food fryer basket is in a position of rest during and at the end of its cycle of operation thereby precluding any unnecessary wear and tear of these parts.

Another object of the present invention is to provide such an automatic basket lift mechanism for food fryers wherein the basket hanger which carries the food fryer basket into the frying area is supported such as to be quickly removable for cleaning.

A further object of the present invention is to provide such an automatic basket lift mechanism for food fryers wherein the basket hanger is hinged so that it will swing up if the hanger and/or the food fryer basket carried thereby encounters an obstruction as the latter is being lowered into the frying area, and in addition so that it will permit removal of the cooking oil bearing kettle.

A still further object of the present invention is to provide such an automatic basket lift mechanism for food fryers wherein upon the completion of the first preselected timed cycle of operation the timer remains preset and the automatic basket lift mechanism is immediately ready to repeat the same timed cycle of operation.

SUMMARY OF THE INVENTION

In accordance with one embodiment of the present invention there is provided a timer-controlled automatic basket lift mechanism for food fryers having a housing with an upper opening which receives a removable kettle containing cooking oil. The basket lift mechanism includes a curved elongated hanger for supporting one or more food baskets for movement therewith, the hanger being pivotally mounted at the top of a shaft which projects upwardly from a rear compartment of the food fryer. The shaft is connected to a vertically reciprocable carriage which rides on ball bearings and which is connected to a lift motor in the housing by a link and lever assembly. The bearings on the carriage are located in channels which are laterally offset from an opening at the rear of the housing so that the bearing and channel assemblies are effectively sealed against contamination by the cooking oil. The motor is controlled by a timer and limit switches such that the food basket is automatically lowered into the kettle and raised therefrom in accordance with a preselected timed cycle. The basket hanger can be removed from the shaft for cleaning and is hinged on the shaft so that it can swing upwardly if it meets an obstruction during its lowering movement and also to permit removal of the kettle from the housing.

The invention will be more fully understood from the following detailed description and its scope will be pointed out in the appended claims.

BRIEF DESCRIPTION OF THE DRAWING

FIG. 3 is a partial end view of the automatic basket lift mechanism of the food fryer of FIG. 1 in accordance with the present invention with parts broken away for purposes of clarity of illustration;

FIG. 4 is a cross-sectional view of the automatic basket lift mechanism of FIG. 3 taken substantially on the line of section 4–4;

DESCRIPTION OF A PREFERRED EMBODIMENT

Figure 1:
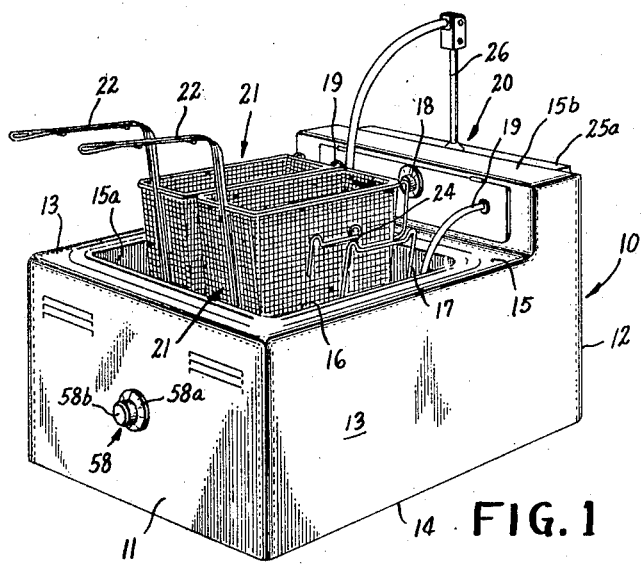
FIG. 1 is a perspective view of a food fryer incorporating a timer-controlled automatic basket lift mechanism in accordance with the present invention.
Figure 7:
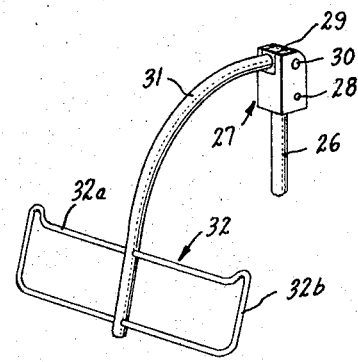
FIG. 7 is a perspective view of the basket hanger assembly of the automatic basket lift mechanism of FIG. 1 in accordance with the present invention.
Figure 2:
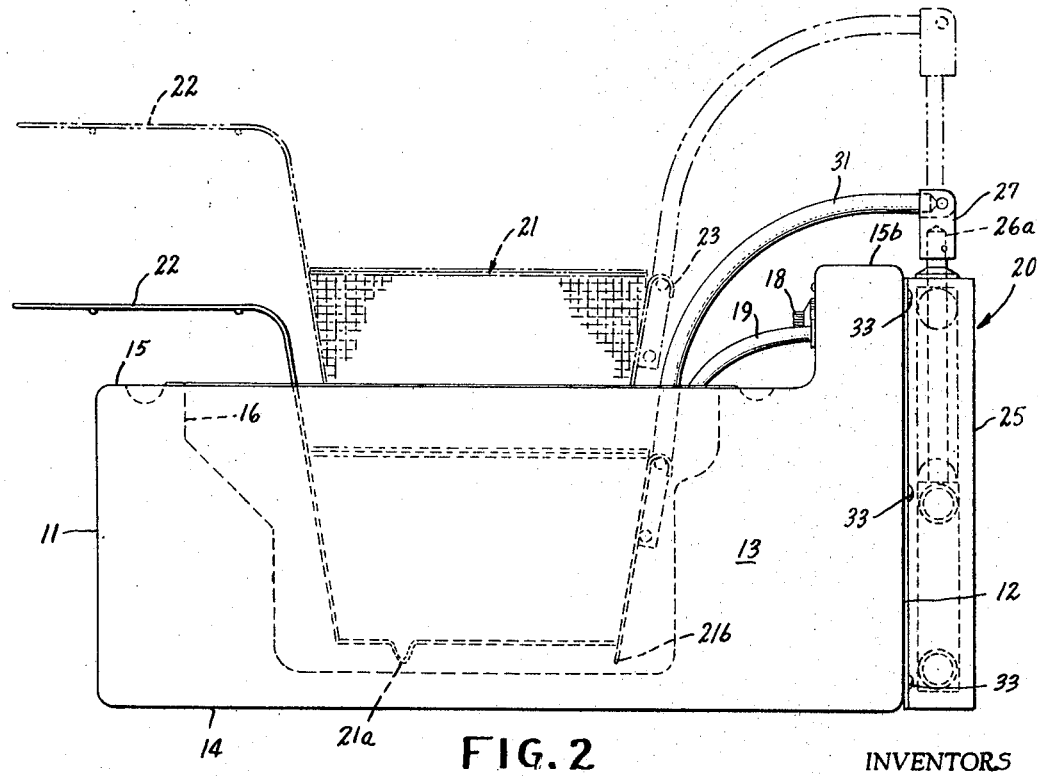
FIG. 2 is a side elevational view of the food fryer with automatic basket lift mechanism of FIG. 1 illustrating the food baskets in their two operative positions, i.e., their cooking and non-cooking positions.

Referring to FIGS. 1 and 2 of the drawings, the invention is shown as incorporated in a food fryer generally designated by reference numeral 10. The food fryer 10 includes front and rear side walls 11 and 12 respectively, a pair of opposed side walls 13, a bottom wall 14, and a top wall 15 having an opening 15a suitably provided therein for receiving the kettle 16 which serves as a container for the frying fat, i.e., the cooking oil. The kettle 16 is suitably dimensioned so as to conform to the configuration of the opening 15a in the top wall 15. Secured to the sides of the kettle 16 adjacent the pair of opposed side walls 13 of food fryer 10 as viewed in FIG. 1 of the drawings are a pair of handles 17 which are provided primarily for the purpose of facilitating the insertion and removal of the kettle 16 into and from the opening 15a in the top wall 15. The aforesaid handles 17 have been omitted in FIG. 2 of the drawings in the interest of clarity of illustration of other structural components of the food fryer 10.

The enclosed rectangular portion 15b which projects upwardly from the top wall 15 adjacent the rear side wall 12 houses the temperature control components of the food fryer 10 in accordance with the practice well-known in the art. Preferably the portion 15b is formed integral with the top wall 15. A conventional temperature control knob 18 having suitable temperature indicia thereon is centrally located on the front surface of the enclosed rectangular portion 15b. Extending outwardly from the front surface of the portion 15b on either side of the temperature control knob 18 are curved tubular members 19 which project downwardly into the kettle 16. Housed within the tubular members 19 are insulated conductors (not shown) which are connected to one or more suitable heating elements (not shown) by virtue of which the cooking oil in the kettle 16 is electrically heated to the desired temperature, i.e., the temperature corresponding to the temperature previously preset on the temperature control knob 18. The heating elements and the insulating conductors as well as the electrical connections therebetween and between the control knob 18 and the insulated conductors have not been illustrated in the drawings inasmuch as they are well-known to those skilled in the art and form no part of the present invention.

The food fryer 10 further includes a timer-controlled automatic basket lift mechanism generally designated by the reference numeral 20 which is provided for the purpose of enabling the food bearing baskets 21 to be automatically raised out of and lowered into the cooking oil contained in the kettle 16 in a manner to be more fully described hereinafter. Insofar as concerns the number of baskets 21 utilized in association with the basket lift mechanism 20 of food fryer 10, this number may vary. For example when a minimum quantity of food is to be cooked at any one particular time, only one of the baskets 21 may be employed. Also, if desired rather than utilizing a pair of relatively small baskets, it is possible to substitute one large basket (not shown) for the pair of baskets 21. However, in accordance with the embodiment of the invention illustrated in FIGS. 1 and 2 of the drawings, a pair of baskets 21 are preferably provided.

Each of the baskets 21 is formed of suitable material such as wire mesh and is provided at one end of its substantially rectangular construction with a curved upwardly extending handle 22 and at the opposite end with a hooked member 23 provided for a purpose to be more fully set forth hereinafter. In addition the bottom wall of the basket 21 is provided with an outwardly extending protrusion 21a which cooperates with the extended portion 21b of the rear end wall of the basket 21 to provide a means for resting the basket 21 on a substantially flat surface. Further, as shown in FIG. 1 of the drawings, each of the baskets 21 may be provided with a handle-like hook member 24 suitably positioned along one side thereof for engagement with one of the handles 17 of the kettle 16 for the purpose of enabling the basket 21 to be temporarily suspended on the aforementioned handle 17 if so desired when, for example, the basket 21 is not being used. The aforesaid handle-like hook member 24 has not been illustrated in FIG. 2 of the drawings in order to be able to more clearly show other features of the food fryer 10.

As best seen with reference to FIGS. 3 and 4 of the drawings, essentially all of the operative parts of the timer-controlled automatic basket lift mechanism 20 are housed within the enclosure 25, the latter being of relatively narrow, substantially rectangular dimensions. In accordance with the embodiment of the invention illustrated in FIGS. 1 and 2 of the drawings, the enclosure 25 is supported on the rear side wall 12 of food fryer 10 by suitable means such as screws 33, and thus in essence when so mounted becomes an integral part of the aforesaid rear side wall 12. However, rather than providing a separate enclosure 25, if so desired the opposed side walls 13 of food fryer 10 could be extended in length an amount approximately equal to the width dimension of the enclosure 25 whereby the extended portions of the opposed side walls 13 and the rear wall 12 of food fryer 10 would house the operative parts of the automatic basket lift mechanism 20.

Extending outwardly of top wall 25a of enclosure 25 through a suitable opening provided therefor is shaft 26, the stub portion 26a of which is detachably received within opening 27a suitably provided in one end of cap member 27. Position pin 28 locates the cap member 27 on the aforesaid stub portion 26a. The other end of cap member 27 is bifurcated whereby a pair of leg portions 27b and 27c are provided extending substantially at right angles to the aforementioned opening 27a in cap member 27. Hinge piece 29 is pivotally mounted between leg portions 27b and 27c by means of pivot pin 30 which passes through suitably aligned openings provided therefor in leg portions 27b, 27c, and hinge piece 29.

Hanger arm 31 has one end thereof secured in an opening provided therefor in hinge piece 29 by suitable means such as brazing, welding, etc. The other end of curved hanger arm 31 is provided with a pair of essentially U-shaped hangers 32a and 32b secured such as by brazing in aligned juxtaposed relation on either side of the hanger arm 31 such as to constitute a unitary basket hanger 32 capable of receiving the hook member 23 provided on one end wall of each of the food bearing baskets 21 whereby the baskets 21 may be supported thereon during the cooking cycle of the food fryer 10 in a manner to be more fully set forth hereinafter.

Figure 6:
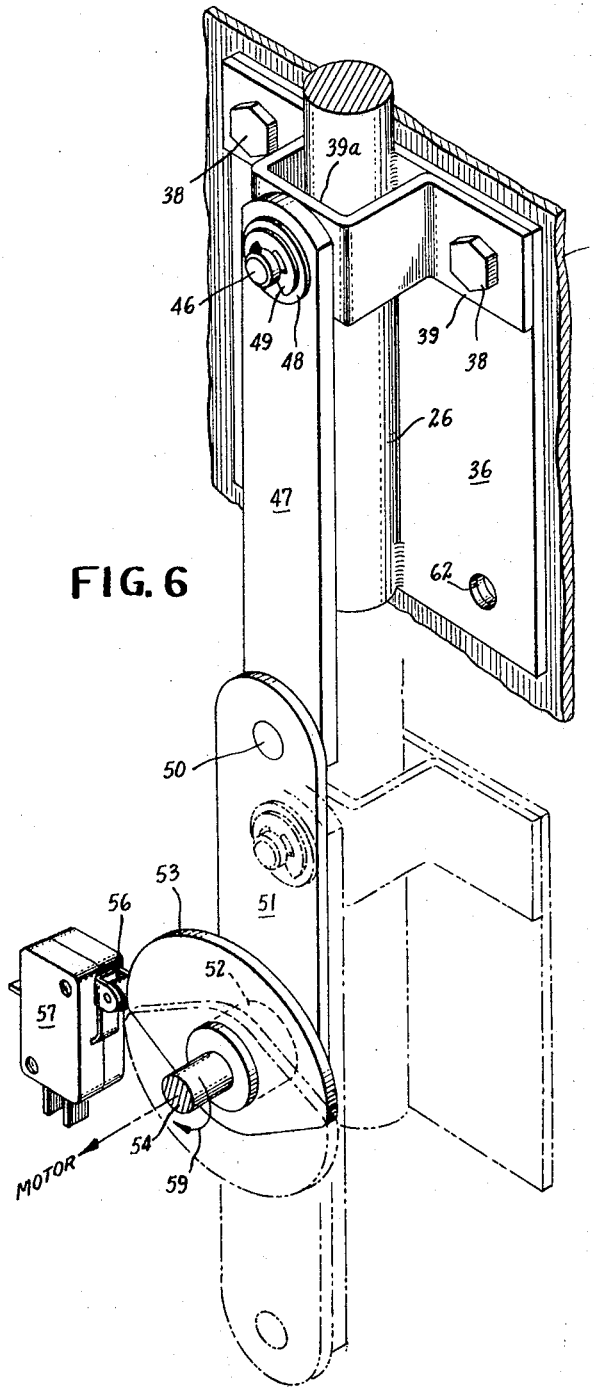
FIG. 6 is an enlarged perspective view of the link and lever assembly of the automatic basket lift mechanism of FIG. 3 in accordance with the present invention illustrating the link and lever assembly in its two operative positions corresponding to the cooking and non-cooking positions of the food baskets illustrated in FIG. 2.

Referring again to FIGS. 3 and 4 of the drawings, the shaft 26 is slidably supported in bushing 34 which is retained in the previously described opening provided for shaft 26 in top wall 25a of enclosure 25 by means of nut 35, the latter being positioned adjacent the interior surface of top wall 25a. Further, as best shown in FIG. 6 the shaft 26 is fixedly secured such as by welding at spaced intervals to support plate 36 which in turn is mounted on slide member or carriage 37 by means of screws 38 received in openings 62 suitably provided therefor in support plate 36 and carriage 37. The screws 38 also serve to secure U-shaped pivot bracket 39 to support plate 36 adjacent the upper end thereof as viewed with reference to FIG. 6 of the drawings. A suitable opening (not shown) is provided for passage of the shaft 26 through the top flange 37a of carriage or slide member 37.

Figure 5:
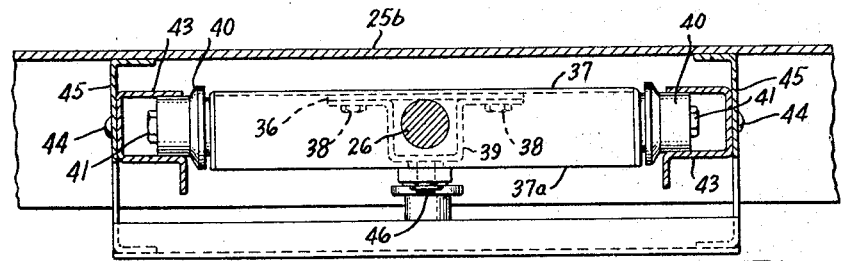
FIG. 5 is a cross-sectional view of the carriage assembly of the automatic basket lift mechanism of FIG. 3 taken substantially on the line of section 5–5.

Adjacent the top and bottom of the carriage 37 on either side thereof there are provided a plurality of ball bearings 40 positioned externally of the carriage 37 for a purpose to be described hereinafter. In accordance with the preferred embodiment of the invention, a total of four such ball bearings 40 are employed, two along each side of the carriage 37. The bearings 40 are each rotatably mounted on the carriage 37 by means of a screw 41 which passes through the hollow center of the ball bearing 40 and into the interior of the carriage 37 through a suitable opening provided therefor in the side wall of the carriage 37 wherein the screw 41 is received by suitable securing means such as a lock washer (not shown) and nut 42. As best seen with reference to FIG. 5 of the drawings, the ball bearings 40 are received by a pair of U-shaped rails 43 each of which is fixedly mounted by screws 44 to a rail support 45 attached by suitable means to the back wall 25b of enclosure 25 in spaced relation relative to each other. The U-shaped portion of rails 43 is dimensioned such as to permit vertical rolling movement of the ball bearings 40 therein but to preclude any lateral movement thereof.

Projecting outwardly from the bight portion 39a of U-shaped pivot bracket 39 in a direction away from shaft 26 and fixedly secured to portion 39a by suitable means such as welding is pivot pin 46 on which one end of link arm 47 is pivotally mounted by means of washer 48 and retaining ring 49, the latter being received in a recess (not shown) provided therefor adjacent the outer end of pivot pin 46. The other end of link arm 47 is pivotally supported on pin 50 which is fixedly attached to one end of lever arm 51 such as by welding. The opposite end of lever arm 51 is provided with a fixedly mounted hub 52 to which a substantially half-moon shaped cam 53 is secured. The hub 52 in turn receives shaft 54 which is suitably driven by motor 55 in a clockwise direction as viewed in FIG. 6. Cam 53 which is fixedly mounted on hub 52 rotates therewith as the latter is caused to rotate by shaft 54 and in doing so activates lever arm 56 of switch 57 in a manner to be more fully set forth hereinafter.

The method of operation of the food fryer 10 is such that the timer 58 which includes a dial 58a having suitable time indicia thereon and a control pushbutton 58b, the latter components being mounted on the front side wall 11 of the fryer 10, is activated by the user. That is, the proper temperature setting having previously been placed on the temperature control knob 18 such that the cooking oil in kettle 16 is now at the desired cooking temperature, the user presets the desired time of cooking on dial 58a of timer 58, and then pushes control pushbutton 58b which effects closure of normally open contacts 61a and opening of normally closed contacts 61b of switch 61. This results in energization of motors 60 and 55 through now closed contacts 61a and normally closed contacts 57a of switch 57 which results in the rotation of shaft 54 in the direction designated by arrow 59 in FIG. 6 of the drawings, i.e., clockwise direction. The latter rotational movement of motor driven shaft 54 causes the linkage assembly comprising lever arm 51 and link arm 47 to collapse about pin 50. That is, the lever arm 51 is rotated in a clockwise direction whereby the lever arm 51 and link arm 47 move from the straight line position illustrated in solid lines in FIG. 6 of the drawings to their respective dotted line positions as illustrated in the same figure. In doing so, the lever arm 51 and link arm 47 lower the carriage or slide member 37 from the position illustrated in solid lines to that shown in dotted lines in FIG. 6. This is by virtue of the fact that the upper end of link arm 47 is secured to U-shaped pivot bracket 39 which in turn is secured to carriage 37 thereby causing the latter to move therewith. The carriage 37 is guided and located in its up and down movement by ball bearings 40 riding in the rails 43 secured to the rail support 45 which are mounted to the interior surface of back wall 25b of enclosure 25. The shaft 26 being suitably secured to the support plate 36 which is attached to carriage 37 by means of screws 38 is thus also lowered, as is the basket hanger 32 which is attached to shaft 26 through hanger arm 31. The lowering of basket hanger 32 properly positions the food baskets 21, detachably supported thereon, in the cooking oil contained in kettle 16.

Figure 8:
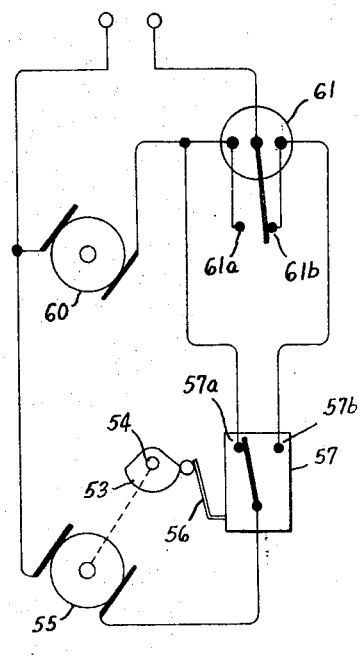
FIG. 8 is a schematic wiring diagram of the electrical control circuit for lowering and raising the automatic basket lift mechanism in a preselected timed cycle in accordance with the present invention.

As the baskets 21 near their lowermost point in kettle 16, the cam 53 driven by shaft 54 engages lever arm 56 of switch 57 closing the normally open contacts 57b and opening the normally closed contacts 57a, the normally open and normally closed position of these contacts being as illustrated in FIG. 8 of the drawing. Thus the lift motor 55 is deenergized because the normally closed contacts 61b of timer switch 61 are open at this time. The timer represented by timer motor 60 and timer switch 61 in FIG. 8, continues to run until the preselected time has elapsed. The timer 58 then opens contacts 61a and closes contacts 61b to energize the lift motor 55 which causes the lever arm 51 and the link arm 47 through shaft 54 to return from their dotted line, i.e., lowermost position in FIG. 6 to their starting position depicted in solid lines in the same figure. This raises the food baskets 21 to their uppermost position as viewed in FIGS. 1 and 2 of the drawings at which time the cam 53 driven by shaft 54 through lift motor 55 opens contacts 57b and closes contacts 57a to thereby open the circuit to the lift motor 55 because contacts 61a are open at this time. The lift cycle is now completed and after removal of the food products from baskets 21, and the placement therein of a second batch of uncooked food products, the timer-controlled automatic basket lift mechanism 20 is ready for reactivation by the user.

Thus, there has been provided a timer-controlled automatic basket lift mechanism 20 for food fryers wherein the vertical lift shaft 26 is attached to a carriage 37 which rides on roller bearings 40. These bearings 40 by virtue of being offset in rails 43 from any opening through which the cooking oil is likely to enter the enclosure 25 remain free of any contamination therefrom. Also the hanger arm 31 and basket hanger 32 associated therewith are arranged such that they can be quickly removed for cleaning simply by lifting cap 27 up and off of shaft 26. The hanger arm 31 furthermore is hinged about pivot pin 30 supported in hinge piece 29 such that the arm 31 will swing up if the basket hanger 32 or the hanger arm 31 or one or both of the baskets 21 meets an obstruction as the basket hanger 32 is lowered into the kettle 16. The pivotal connection of hanger arm 31 moreover facilitates the removal of kettle 16 from the opening 15a provided therefor in the top wall 15 of food fryer 10. Further, as mentioned hereinabove the lift motor 55 and the majority of the parts associated therewith do not operate, i.e., run when the food fryer baskets 21 are in a position of rest during and at the end of its cycle of operation thereby precluding any unnecessary wear and tear of these parts. Finally, the circuit operation of the timer-controlled automatic basket lift mechanism 20 is such that upon the completion of a first preselected timed cycle of operation the timer remains preset and the automatic basket lift mechanism 20 is immediately ready to repeat the same timed cycle of operation.

While only one embodiment of our invention has been shown, it will be appreciated that many modifications thereof may readily be made by those skilled in the art. For example, in larger capacity units it may be desirable to utilize two timer-controlled automatic basket lift mechanisms 20 together under the control of a common timer 58 or individual timers 58. Each of these mechanisms 20 might be utilized in association with two food baskets 21 or a large basket approximately equal in capacity to two food baskets 21, or the aforesaid two mechanisms might be utilized in conjunction with only one food carrying basket of very large capacity. Similarly, the timer-controlled automatic basket lift mechanism 20 is readily adaptable to being mounted within the interior of the side walls of food fryer 10 or in a separate enclosure adjacent the exterior of any one particular side wall of the food fryer 10. We therefore intend by the appended claims to cover the above modifications as well as all other modifications which fall within the true spirit and scope of our invention.

We claim:

1. A food service device having automatic basket lift means comprising:
   a. a housing having a plurality of side walls and a top and bottom wall, said top wall having an opening therein;
   b. container means for receiving frying fat;
   c. means removably supporting said container means within said opening in said top wall of said housing;
   d. at least one food bearing basket movable into said container means;
   e. at least one automatic basket lift means;
   f. means mounting said automatic basket lift means to said housing in juxtaposed relation to one of said plurality of side walls of said housing;
   g. said automatic basket lift means including a shaft movable relative to said top wall of said housing, a basket hanger secured to said shaft for supporting said food bearing basket, a reciprocable carriage, means fixedly connecting said shaft to said reciprocable carriage, motor means supported within said housing, and a link and lever assembly connecting said motor means to said carriage, said link and lever assembly translating rotational movement of said motor means into a reciprocating movement of said carriage;

h. guide means for said carriage comprising a pair of spaced channel means and a plurality of laterally offset roller means receivable within said channel means for movement relative thereto, said plurality of roller means being supported on said carriage; and i. timer means supported on said housing and electrically connected to said motor means, said timer means including means operable to energize said motor means in accordance with a predetermined cycle to automatically raise and lower said food bearing basket into and out of said container means in accordance with a preselected cooking cycle.

2. A food service device having automatic basket lift means as set forth in claim 1 wherein:

a. said plurality of side walls of said housing includes a front side wall, a rear side wall, and a pair of opposed side walls; and b. said means mounting said automatic basket lift means includes a rectangular enclosure having at least one open side, and securing means for attaching said enclosure to said housing with said open side of said enclosure in juxtaposed relation to said rear side wall of said housing.

3. A food service device having automatic basket lift means as set forth in claim 1 wherein:

a. a pair of food bearing baskets are supported in side-by-side relation, said pair of food bearing baskets being movable simultaneously; and b. said basket hanger is pivotally mounted to said shaft to permit said container means to be removed from said opening in said top wall of said housing, and to permit said basket hanger to swing upwardly if at least one of said basket hanger and said food bearing baskets supported thereon encounters an obstruction as said pair of food bearing baskets are being lowered into said container means.

4. A food fryer comprising:

a. a housing having top and bottom walls, a front side wall, a rear side wall, and a pair of opposed side walls, said top wall having an opening therein;

b. a kettle containing cooking oil;

c. means removably supporting said kettle in said opening in said top wall of said housing;

d. motor means supported within said housing;

e. a pair of food carrying baskets movable into said kettle;

f. at least one automatic basket lift mechanism;

g. means mounting said automatic basket lift mechanism in juxtaposed relation to said rear side wall of said housing;

h. said automatic basket lift mechanism including a shaft movable relative to said top wall of said housing, a basket hanger, means mounting said basket hanger on said shaft for movement therewith and for movement with respect thereto, a reciprocable carriage, means fixedly connecting said shaft to said carriage, link and lever means connecting said motor means to said carriage, said link and lever means translating rotational movement of said motor means into a reciprocating movement of said carriage, and guide means for said carriage comprising a pair of spaced channel means and a plurality of roller means receivable within said channel means for movement relative thereto, said plurality of roller means being supported on said carriage; and i. timer means supported on said housing and electrically connected to said motor means, said timer means including control means operable by a user to energize said motor means in accordance with a predetermined cycle to automatically raise and lower said food bearing baskets into and out of said kettle in accordance with a preselected cooking cycle.

5. A food fryer as set forth in claim 4 wherein:

a. said means mounting said automatic basket lift mechanism includes a rectangular enclosure having at least one open side, and securing means for attaching said enclosure to said housing with said open side of said enclosure in juxtaposed relation to said rear side wall of said housing; and b. said means mounting said basket hanger to said shaft includes a cap member detachably secured to said shaft, and a hanger arm pivotally mounted on said cap member, said basket hanger being securely fastened to said hanger arm.

6. A timer-controlled automatic basket lift mechanism for lowering and raising at least one food basket into and out of a frying fat bearing container of a food service device in accordance with a preselected cooking cycle, said food service device including a housing and timer-actuated motor means, comprising:

a. a single shaft movable relative to said housing;

b. a basket hanger;

c. means mounting said basket hanger on said shaft for movement therewith and for movement with respect thereto comprising a cap member detachably secured to said shaft, and a hanger arm pivotally mounted on said cap member, said basket hanger being securely fastened to said hanger arm;

d. a reciprocable carriage;

e. means fixedly connecting said shaft to said carriage;

f. a link and lever assembly connecting said motor means to said carriage, said link and lever assembly translating rotational movement of said motor means into a reciprocating movement of said carriage; and g. guide means for said carriage comprising a pair of spaced laterally offset channel-shaped members and a plurality of ball bearings receivable within said channel members, said plurality of ball bearings being supported on said carriage.